(12) United States Patent
Sakurai et al.

(10) Patent No.: US 11,114,247 B2
(45) Date of Patent: Sep. 7, 2021

(54) MULTILAYER CERAMIC CAPACITOR HAVING A CAPACITOR ELEMENT BODY INCULDING A DIELECTRIC LAYER AND AN INTERNAL ELECTRODE LAYER

(71) Applicant: TDK CORPORATION, Tokyo (JP)

(72) Inventors: Dan Sakurai, Tokyo (JP); Toshihiko Kaneko, Tokyo (JP); Nobuto Morigasaki, Tokyo (JP); Toshinari Takahashi, Tokyo (JP); Yasuhiro Ito, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/250,911

(22) Filed: Jan. 17, 2019

(65) Prior Publication Data

US 2019/0237264 A1 Aug. 1, 2019

(30) Foreign Application Priority Data

Jan. 31, 2018 (JP) .............................. JP2018-015888

(51) Int. Cl.
*H01G 4/30* (2006.01)
*H01G 4/12* (2006.01)
*H01G 4/008* (2006.01)

(52) U.S. Cl.
CPC .............. *H01G 4/30* (2013.01); *H01G 4/008* (2013.01); *H01G 4/1245* (2013.01)

(58) Field of Classification Search
CPC ......... H01G 4/1245; H01G 4/30; H01G 4/012
See application file for complete search history.

(56) References Cited

U.S. PATENT DOCUMENTS

| 5,296,425 A | * | 3/1994 | Chazono | C04B 35/465 |
| | | | | 501/138 |
| 6,225,250 B1 | * | 5/2001 | Wada | H01G 4/1227 |
| | | | | 501/137 |
| 7,061,748 B2 | * | 6/2006 | Ito | B32B 18/00 |
| | | | | 361/321.4 |
| 2002/0039272 A1 | * | 4/2002 | Mizuno | H01G 4/232 |
| | | | | 361/311 |
| 2003/0109375 A1 | * | 6/2003 | Gohlke | B82Y 30/00 |
| | | | | 501/135 |
| 2003/0160219 A1 | * | 8/2003 | Shimizu | H01G 4/0085 |
| | | | | 252/500 |

(Continued)

FOREIGN PATENT DOCUMENTS

| CN | 102531591 A | * | 7/2012 | .......... H01G 4/1245 |
| JP | 2003-077761 A | | 3/2003 | |

(Continued)

*Primary Examiner* — David M Sinclair
(74) *Attorney, Agent, or Firm* — Oliff PLC

(57) ABSTRACT

The object of the present invention is to provide the multilayer ceramic capacitor having no deterioration of dielectric properties even in case an inhibitor of an internal electrode layer is pushed out to a dielectric layer when sintering. The multilayer ceramic capacitor 1 including a capacitor element body 10 comprising a dielectric layer 2 and an internal electrode layer 3 stacked in an alternating manner, wherein when Za represents Zr concentration of an dielectric particle in a center part 6 of the dielectric layer 2 and Zb represents Zr concentration of a dielectric particle near the internal electrode layer, $0<(Za/Zb)<1$ is satisfied.

2 Claims, 4 Drawing Sheets

(56) References Cited

U.S. PATENT DOCUMENTS

| | | | |
|---|---|---|---|
| 2006/0208575 A1* | 9/2006 | Orimo | H01G 4/0085 307/109 |
| 2006/0254693 A1* | 11/2006 | Murosawa | B32B 18/00 156/89.14 |
| 2007/0142210 A1* | 6/2007 | Muto | C04B 35/49 501/138 |
| 2011/0195178 A1* | 8/2011 | Kojima | C04B 35/62685 427/126.3 |
| 2012/0075770 A1* | 3/2012 | Banno | C04B 35/62685 361/321.4 |
| 2017/0025222 A1* | 1/2017 | Park | H01G 4/0085 |
| 2017/0271082 A1* | 9/2017 | Yoon | C01G 25/02 |

FOREIGN PATENT DOCUMENTS

| | | | | |
|---|---|---|---|---|
| JP | 2009173473 A | * | 8/2009 | H01G 4/1218 |
| JP | 2009209034 A | * | 9/2009 | H01G 4/1227 |
| JP | 2017108149 A | * | 6/2017 | H01G 4/1218 |
| JP | 2018137286 A | * | 8/2018 | |
| KR | 20060048406 A | * | 5/2006 | C04B 35/49 |

* cited by examiner

MULTILAYER CERAMIC CAPACITOR HAVING A CAPACITOR ELEMENT BODY INCLUDING A DIELECTRIC LAYER AND AN INTERNAL ELECTRODE LAYER

BACKGROUND OF THE INVENTION

The present invention relates to a multilayer ceramic capacitor, and particularly to the multilayer ceramic capacitor having good IR property and high temperature accelerated lifetime.

Recently, as the electronic circuit has become highly densified, an electronic component is demanded to be more compact, and the multilayer ceramic capacitor has rapidly become more compact and has larger capacity, further the purpose of use has become wider, thus various properties are demanded.

For example, a mid-high voltage capacitor which is used at a high rated voltage (for example 100 V or higher) is suitably used for ECM (Engine Electric Computer Module), a fuel injection device, an electric controlled throttle, an inverter, a convertor, HID headlamp unit, a battery control unit for hybrid engine, a digital steel camera, and the like.

The multilayer ceramic capacitor can be obtained by firing a green chip in which a green sheet made of a dielectric material and a green sheet made of internal electrode material are stacked in alternating manner. However, when firing the green chip, a dielectric layer and an internal electrode layer may be released from each other due to the difference of a thermal shrinkage of the dielectric material and a thermal shrinkage of the internal electrode material. Therefore, in order to relieve this difference, a dielectric material which is called an inhibitor may be used in the internal electrode material.

For example, Patent Document 1 (JP Patent Application Laid Open No. 2003-77761) discloses a multilayer ceramic capacitor using $PbTiO_3$ based dielectrics, and proposes to blend larger dielectric particles to the internal electrode layer than dielectric particles constituting a dielectric layer. By blending the large dielectric particles to the internal electrode layer, dielectric layers formed on and below the internal electrode layer are connected by the large dielectric particles included in the internal electrode layer, an interlayer release can be prevented.

In the multilayer ceramic capacitor using barium titanate ($BaTiO_3$) based dielectric particles, similarly, barium titanate is blended in the internal electrode layer as the inhibitor. As sintering of the internal electrode progresses, the inhibitor which was blended in the internal electrode is pushed out to the dielectric layer, and is sintered with barium titanate of the dielectric layer. However, at this time, oxygen defect occurs in barium titanate particle constituting the dielectric layer, and an insulation resistance of the dielectric layer may decline and dielectric properties may be compromised.
Patent document 1: JP Patent Application Laid Open No. 2003-77761

SUMMARY OF THE INVENTION

The present invention is attained in view of such circumstances, and the object is to provide a multilayer ceramic capacitor having no deterioration of dielectric properties even in case an inhibitor of an internal electrode layer is pushed out to a dielectric layer when sintering.

In order to attain the above object, the multilayer ceramic capacitor according to an embodiment of the present invention is a multilayer ceramic capacitor including a capacitor element body comprising a dielectric layer and an internal electrode layer stacked in an alternating manner, wherein when Za represents Zr concentration of a dielectric particle in a center part of the dielectric layer and Zb represents Zr concentration of a dielectric particle near the internal electrode layer, $0 < (Za/Zb) < 1$ is satisfied.

In the present embodiment, a dielectric ceramic composition constituting the dielectric layer preferably includes a main component made of a perovskite type compound expressed by a compositional formula of $(Ba_{1-x-y}Sr_xCa_y)_m(Ti_{1-z}Zr_z)O_3$ (note that, m, x, y, and z of the above compositional formula all represent molar ratios, and each satisfies $0.9 < m < 1.1$, $0 \leq x \leq 0.5$, $0 \leq y \leq 0.3$, $0 \leq (x+y) \leq 0.6$, and $0.03 \leq z \leq 0.3$).

Also, in the present embodiment, Za/Zb preferably satisfies $0 < (Za/Zb) < 0.9$.

According to the present invention, Zr concentration (Za) of a center part of the dielectric layer and Zr concentration (Zb) of the dielectric particle near the internal electrode of the multilayer ceramic capacitor satisfies the relationship of $0 < (Za/Zb) < 1$. This means that Zr concentration (Zb) of the dielectric particle near the internal electrode layer is higher than Zr concentration (Za) of the center part of the dielectric layer. Since the dielectric particle having high concentration of Zr is present in the dielectric layer near the internal electrode layer, the dielectric layer having high concentration of Zr is locally formed. Oxygen defect is barely formed in the dielectric layer having high concentration of Zr, thus the deterioration of the insulation resistance is suppressed and the deterioration of the high temperature accelerated lifetime is also suppressed.

DETAILED DESCRIPTION OF THE INVENTION

Hereinafter, the present invention will be described based on the embodiment shown in the figures.
Multilayer Ceramic Capacitor 1

Figure 1:
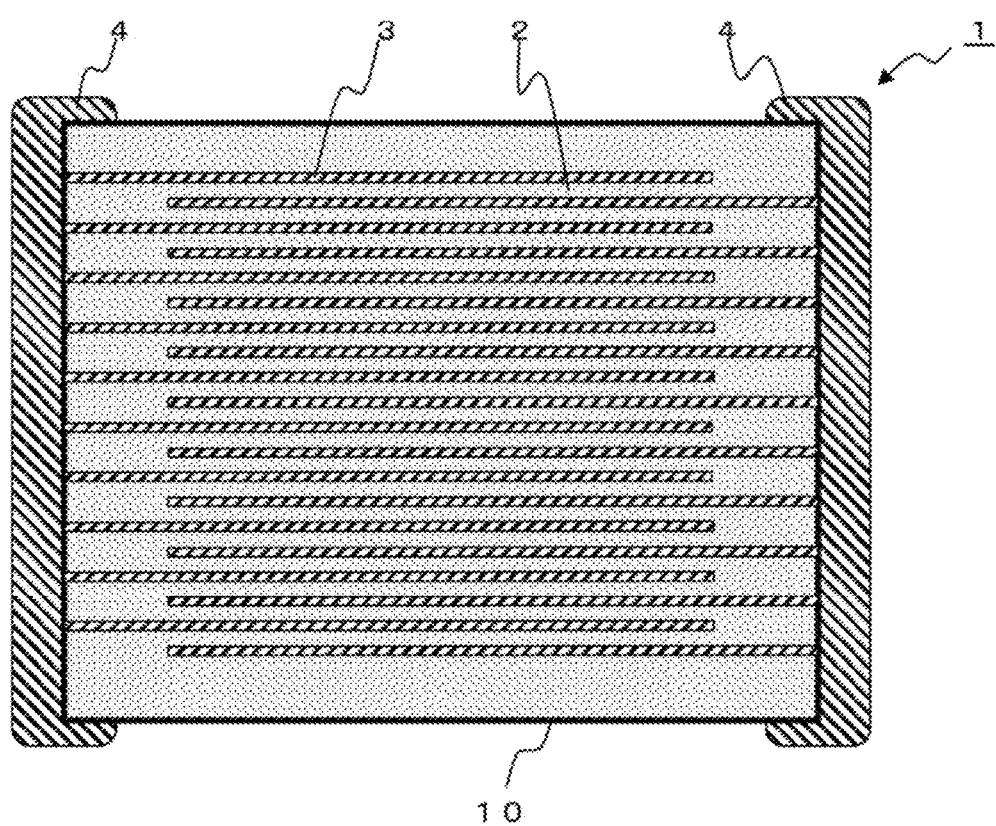
FIG. 1 is a cross section of a multilayer ceramic capacitor according to an embodiment of the present invention.

As shown in FIG. 1, a multilayer ceramic capacitor 1 has a capacitor element main body 10 in which a dielectric layer 2 and an internal electrode layer 3 are stacked in alternating manner. The internal electrode layer 3 is stacked so that each end face is alternatingly exposed to the surface of the two end parts of the capacitor element main body 10 opposing with each other. A pair of the external electrodes 4 is formed at both end parts of the capacitor element main body 10, and are connected to the exposed end face of the internal electrode layer 3 placed alternatingly, thereby the capacitor circuit is formed.

The shape of the capacitor element body 10 is not particularly limited, and as shown in FIG. 1, usually it is rectangular parallelepiped shape. Also, the size thereof is not particularly limited, and the size may be determined appropriately depending on the purpose of use.

Dielectric Layer 2

A thickness of the dielectric layer 2 is not particularly limited, and it is preferably 0.5 to 20 µm or so per one layer.

A number of the dielectric layer 2 being stacked is not particularly limited, and preferably it is 20 or more, more preferably 50 or more, and particularly preferably 100 or more. The maximum number of stacking is not particularly limited, and for example it is 2000 or so.

The dielectric layer 2 is constituted from the dielectric ceramic composition. The dielectric ceramic composition is not particularly limited, and preferably as a main component, barium titanate based composite oxide which is perovskite type ($ABO_3$ type) and zirconium partially substituting for B site. Further, sub components described in below may be included if needed. Hereinafter, the preferable embodiment is described.

(Dielectric Ceramic Composition)

The main component of the dielectric ceramic composition according to the preferable embodiment is a perovskite type compound which is expressed by a compositional formula of $(Ba_{1-x-y}Sr_xCa_y)_m(Ti_{1-z}Zr_z)O_3$. Here, m, x, y, and z all show molar ratios.

In the compositional formula, m shows A/B ratio, and it is $0.9 \leq m \leq 1.1$, and preferably $0.95 \leq m \leq 1.0$. Also, in other preferable embodiment, m may be $0.9 \leq m \leq 0.95$, and also it may be $1.0 \leq m \leq 1.1$. When the value m of the main component is too small, IR property decreases due to over sintering (abnormal crystal growth), and when the value m is too large, then the high temperature accelerated lifetime may decline.

In the compositional formula, x shows a ratio of Sr in A site, and it is $0 \leq x \leq 0.5$, preferably $0 \leq x \leq 0.2$, more preferably $0 \leq x \leq 0.1$, further preferably $0 \leq x \leq 0.03$, and it may be 0.

In the compositional formula, y shows a ratio of Ca in A site, and it is $0 \leq y \leq 0.3$, preferably $0 \leq y \leq 0.2$, more preferably $0 \leq y \leq 0.1$, further preferably $0 \leq y \leq 0.01$, and it may be 0.

Also, (x+y) is $0 \leq (x+y) \leq 0.6$, preferably $0 \leq (x+y) \leq 0.4$, more preferably $0 \leq (x+y) \leq 0.2$, further preferably $0 \leq (x+y) \leq 0.03$, and it may be 0.

In the compositional formula, z shows a ratio of Zr in B site, and it is preferably $0.03 \leq z \leq 0.3$, and preferably $0.1 \leq z \leq 0.18$. Also, in other preferable embodiment, z may be $0.03 \leq z \leq 0.1$, and it may be $0.18 \leq z \leq 0.3$. By substituting Zr for B site, the bandgap becomes higher, and the insulation resistance can be increased. On the other hand, when Zr is too much, the high temperature accelerated lifetime tends to decrease.

The dielectric composition may include sub components other than the above mentioned main component if necessary. As the preferable sub components, oxides of the rare earth element R as a first sub component, oxides of Mg as a second sub component, oxides of at least one element M selected from the group consisting of Mn, Cr, Co, and Fe as a third sub component, and a sintering aid may be mentioned.

The dielectric ceramic composition may include oxides of the rare earth element R as the first sub component. Here, the rare earth element is at least one selected from the group consisting of Sc, Y, La, Ce, Pr, Nd, Pm, Sm, Eu, Gd, Tb, Dy, Ho, Er, Tm, Yb, and Lu. Preferably, it is at least one selected from the group consisting of Eu, Gd, and Tb. Note that, two or more of the oxides of the rare earth element can be used together.

In case of using the oxides of the rare earth element R, the blending amount is preferably 0.1 to 30 mol, more preferably 1 to 20 mol, and more preferably 10 to 18 mol with respect to 100 mol of the main component. Also, as other preferable embodiment, it may be 0.1 to 10 mol, and it may be 18 to 30 mol as well. Note that, the oxides of the rare earth element is usually shown as $R_2O_3$, and the ratio in terms of oxides in the present embodiment is shown as the mol number based on $RO_{3/2}$. Although it is not to be theoretically limited in any way, part of the rare earth element R substitutes for A site, and act as donor which releases electron. The released electron captures oxygen defect, thus the movement of the oxygen defect during the high temperature accelerated lifetime test is suppressed, and it is thought to enhance the high temperature accelerated lifetime. When the content of the first sub component is too little, the movement of the oxygen defect cannot be suppressed, thus the high temperature accelerated lifetime may decrease. When the first sub component is too much, the IR property may decrease.

The second sub component is preferably used in a ratio of 0 to 15 mol, preferably 3 to 10 mol, and further preferably 4.5 to 8 mol in terms of oxides (MgO) with respect to 100 mol of said main component. Also, in other preferable embodiment, it may be 3 to 4.5 mol, and 8 to 10 mol as well. By having the content of the second sub component within the above mentioned range, IR property and the high temperature accelerated lifetime tend to improve in good balance.

The dielectric ceramic composition may include the oxides of at least one element M selected from the group consisting of Mn, Cr, Co, and Fe as the third sub component. Preferably, it includes MnO, CrO, and particularly preferably it includes MnO. Note that, two or more of oxides of Mn, Cr, Co, and Fe may be used together. The ratio of the third sub component is 0 to 5.0 mol, preferably 0.6 to 3.0 mol, and more preferably 1.1 to 1.5 mol in terms of the oxides (MO) with respect to 100 mol of the main component. Also, in other preferable embodiment, it may be 0.6 to 1.1 mol, and it may also be 1.5 to 3.0 mol. When the content of the third sub component is within the above mentioned range, IR property tends to improve. Note that, the ratio of the third sub component in terms of the oxides shows the mol number based on MnO, CrO, CoO, and FeO.

Although it is not to be theoretically limited in any way, part of the metal elements included in the second and third sub components serve as the acceptor which substitutes for B site and receives electron, and it is thought to contribute to the improvement of IR property.

The dielectric ceramic composition can further include the sintering aid. The sintering aid is not particularly limited as long as it contributes to sintering of the above mentioned main component, and usually oxides of Si, Li, Al, Ge, and B are preferably used. In case of using the sintering aid, the amount of the sintering aid used are preferably 0.2 mol or more, more preferably 1.5 to 4.0 mol or more, and particularly preferably 2.0 to 3.3 mol in terms of $SiO_2$, $LiO_{1/2}$, $AlO_{3/2}$, $GeO_2$, or $BO_{3/2}$ with respect to 100 mol of the main component. By having the content of the sintering aid within this range, the insulation resistance and the high temperature accelerated lifetime tend to improve. When the content of the sintering aid is too much, the high temperature accelerated lifetime tends to deteriorate. On the other hand, when too little, the sintering property tends to decline.

As the sintering aid, oxides of Si are preferably used among the above mentioned oxides, because it has great effect to improve the properties. As the oxides including Si, it is not particularly limited, and it may be in a form of $SiO_2$ alone, or it may be in a form of composite oxides between Si and other elements such as alkali metal and alkaline earth metal. In the present embodiment, $SiO_2$ is preferable as the oxides including Si.

By setting the composition of the main component, and the contents of sub components and sintering aid within the above mentioned range, the dielectric ceramic composition having particularly good IR property and high temperature accelerated lifetime can be easily obtained.

The dielectric ceramic composition may further include other components depending of the desired property. The composition of the dielectric ceramic composition can be verified by a fluorescent X-ray analysis.

Internal Electrode Layer 3

The conductive material included in the internal electrode layer 3 is not particularly limited, and because the material constituting the dielectric layer 2 is reduction resistant, a relatively inexpensive base metal can be used. As the base metal used as the conductive material, Ni or Ni alloy is preferable. As Ni alloy, the alloy made from Ni and one or more elements selected from the group consisting of Mn, Cr, Co, and Al is preferable, and preferably the content of Ni in the alloy is 95 mass % or more. Note that, in Ni or Ni alloy, various trace components such P and the like may be included by 0.1 mass % or less. Also, in the internal electrode layer, the dielectric particle including Zr is blended as the inhibitor. The thickness of the internal electrode layer 3 may be determined accordingly based on the purpose of use, and usually it is preferably 0.1 to 3 μm or so.

External Electrode 4

The conductive material included in the external electrode 4 is not particularly limited, and inexpensive Ni, Cu, and the alloy thereof can be used in the present invention. The thickness of the external electrode 4 can be determined appropriately depending on the purpose of use, and usually it is preferably 10 to 50 μm or so.

(Structure of Dielectric Layer)

The multilayer ceramic capacitor according to the present embodiment has a concentration gradient of Zr in the dielectric layer.

Specifically, when Za represents Zr concentration of dielectric layer in the center part of the dielectric layer and when Zb represents Zr concentration of the dielectric particle near the internal electrode layer, $0<(Za/Zb)<1$ is satisfied, and preferably $0<(Za/Zb)<0.9$ is satisfied. Also, in other embodiment, it may be $0.9 \le (Za/Zb)<1$.

Figure 2:
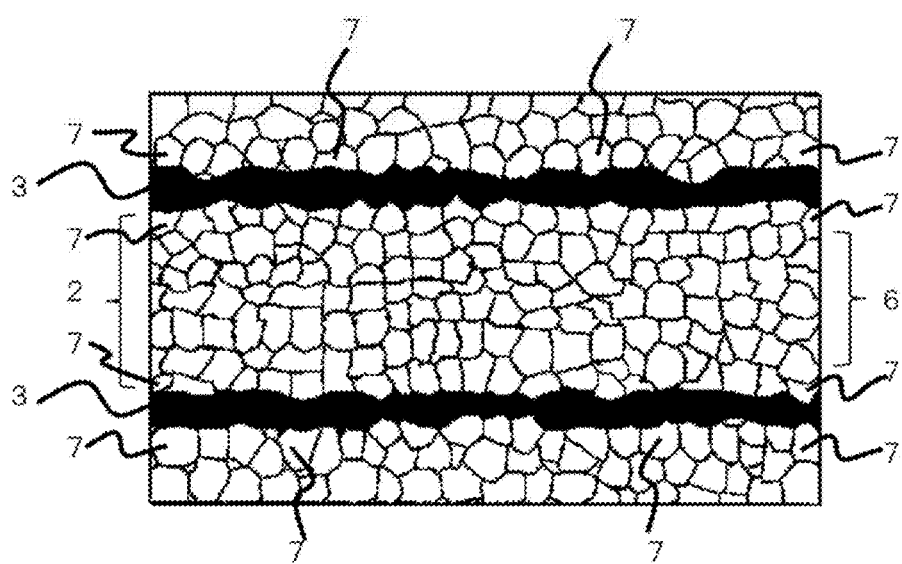
FIG. 2 is an enlarged cross section of an essential part of FIG. 1.

Here, as shown in FIG. 2, the center part 6 of the dielectric layer 2 refers to a center part in a stacking direction of the multilayer ceramic capacitor. Preferably, it refers to an area of about 60% or so of the center part with respect to entire thickness of the dielectric layer 2. For example, when the thickness of the dielectric layer 2 is 10 the area of 6 μm excluding the upper 2 μm and bottom 2 μm of the dielectric layer is the center part of the dielectric layer. Also, the particle of the center part of the dielectric layer does not include the dielectric particle 7 which contacts with the internal electrode layer 3. The dielectric particle of the dielectric layer near the internal electrode layer 3 refers to the dielectric particle 7 which contacts with the internal electrode layer 3. The average of Zr concentration of the dielectric particle in the center part 6 of the dielectric layer 2 is defined as Za, and the average of Zr concentration of the dielectric particle 7 near the internal electrode layer 3 is defined as Zb.

Zr concentration (Za) of the dielectric particle of the center part of the dielectric layer and Zr concentration (Zb) of the dielectric particle near the internal electrode layer may be evaluated in terms of weight or in terms of mol. However, the measurement of Zr concentration of each dielectric particle is carried out by STEM-EDS as it is easy and accurate. At this time, Za and Zb are evaluated as the concentration of Zr atom (atom %) when the concentration of Ti atom in each dielectric particle is deemed to be 100 atom %.

Therefore, in the preferable embodiment, Za represents the average of Zr concentration (atom %) of the dielectric particle in the center part of the dielectric layer and Zb represents the average of Zr concentration of the dielectric particle near the internal electrode layer when the concentration of Ti atom of the dielectric particle is deemed to 100 atom %.

Za and Zb are measured by carrying out a point analysis of Zr using Energy Ray Dispersive X-ray Spectrometer (EDS) attached to Scanning Transmission Electron Microscope (STEM). This point analysis is preferably carried out by selecting arbitrary 10 or more points taking 100 nm between each measuring point for each measuring particle, and it is preferably carried out to 10 or more dielectric particles. The composition of Ti is measured simultaneously with the above, and the average of the measured Zr composition of each analysis point is calculated to obtain the average Zr concentration (Za) of the dielectric particle in the center part of the dielectric layer and the average Zr concentration (Zb) of the dielectric particle near the internal electrode layer when the concentration of the Ti atom is deemed to be 100 atom %.

Figure 3:
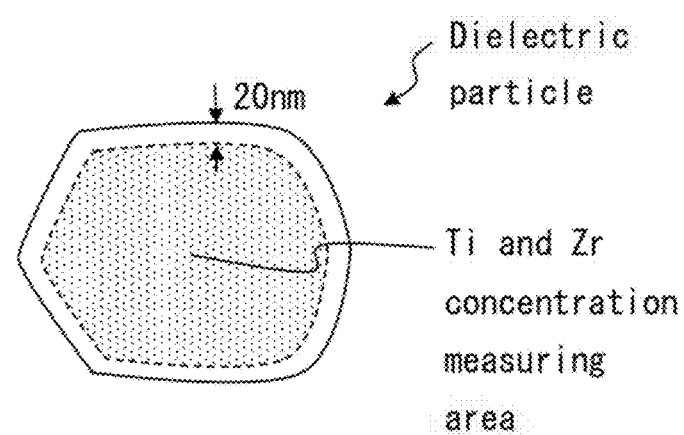
FIG. 3 is a schematic diagram showing measurement point of Ti concentration and Zr concentration (Za, Zb) of the dielectric particle.

As shown in FIG. 3, the measurement point is selected from the area excluding the area which is 20 nm or less from the particle boundary of the dielectric particle.

In the present embodiment, Za/Zb which is the ratio between Za and Zb is within the above range.

Also, the average (Za) of Zr concentration (atom %) of the dielectric particle in the center part of the dielectric layer when the concentration of Ti atom of the dielectric particle is deemed to be 100 atom % is preferably 2.5 to 35 atom %, and more preferably 10 to 20 atom %. Also, the average (Zb) of Zr concentration of the dielectric particle near the internal electrode layer when the concentration of Ti atom of the dielectric particle is deemed to be 100 atom % is preferably 2.7 to 36 atom %, and more preferably 12 to 22 atom %.

The thickness of the dielectric layer 2 is preferably 0.5 to 20 μm or so. Thus, the average particle size (circle equivalent diameter) of the dielectric particle constituting the dielectric layer 2 is preferably 0.1 to 2.0 μm, more preferably 0.6 to 1.5 μm. The dielectric composition constituting the dielectric layer 2 includes the dielectric particles and the particle boundary, and segregation phase may be included. The dielectric particles preferably include the complete solid solution particle having uniform composition. The dielectric particles may include a particle having a so called core-shell structure. The shape of the dielectric particle is not particularly limited.

In $BaTiO_3$ based main component of the complete solid solution particle, Zr substitutes for Ti site, Zr composition is substantially uniform, and Zr is uniformly dispersed. The dielectric particle having the core-shell structure is formed from phase (usually called as "core") only made of the main component and phase (diffusion phase) in which the sub components (particularly the rare earth element) dispersed in the main component. Note that, sub components other than the rare earth element may be solid dissolved in the main component. Also, the segregation phase is phase in which the main component composition is out of the range of the above composition and for example includes excess Ti, Zr, rare earth element, or alkali metals. In the present embodiment, 90% or more of the entire dielectric particles are preferably the complete solid solution particles.

Method of Producing Multilayer Ceramic Capacitor 1

The multilayer ceramic capacitor 1 of the present embodiment is produced as similar to the conventional multilayer ceramic capacitor, that is the green chip is produced by a usual printing method or sheet method using a paste, and firing is carried out, followed by printing or transferring of the external electrode then firing, thereby the multilayer ceramic capacitor 1 of the present embodiment is produced. Hereinafter, the non-limiting example of the production method will be explained.

(Preparation of Dielectric Layer Paste)

First, a dielectric material for forming the dielectric layer is prepared, then this is made into a paste, thereby a dielectric layer paste is prepared.

(Materials)

As the dielectric material, the material of the main component and, if needed, the material of each sub components are prepared. As the materials thereof, oxides of the above mentioned component, a mixture thereof, and composite oxides can be used. Also, various compounds which form the above mentioned oxides and composite oxides by firing, such as carbonate, oxalate, nitrate, hydroxides, organometallic compound, and the like can be selected accordingly and mixed for use.

As the material of the main component, those made by various methods such as a so-called solid phase method and various liquid phase methods (for example, an oxalate method, a hydrothermal synthesis method, an alkoxide method, a sol gel method, and the like) can be used.

Further, in case components other than the above mentioned main component and sub components are included in the dielectric layer, as the material of such components, as similar to the above, oxides of these components, mixture thereof, and composite oxides can be used. Also, in addition, various compounds which become the above mentioned oxides and the composite oxides by firing can be used as well. The content of each compound in the dielectric material may be determined so that it satisfies the composition of the above mentioned dielectric ceramic composition after firing.

(Preparation of Dielectric Raw Material)

In order to obtain the dielectric ceramic composition according to the present embodiment, preferably each raw material mentioned in above is mixed at once and calcined.

In order to prepare the dielectric raw material, the raw material of each component is thoroughly mixed to obtain mixed powder, then this is heat treated (calcined), and a calcined raw material is obtained. The mixing of the raw material is not particularly limited, and it is thoroughly mixed for 20 hours or so by a wet method, then dried.

A calcining condition is not particularly limited, and a calcining temperature is 900 to 1350° C., preferably 1000 to 1350° C., a temperature holding time is preferably 1 to 10 hours, a temperature increasing rate up to the calcining temperature is 10° C./hour to 2000° C./hour or so, a temperature decreasing rate after the holding time at the calcining temperature is 200° C./hour or more, preferably 300° C./hour or more, and more preferably 400° C./hour or more.

In order to obtain the complete solid solution particle, the holding time is set relatively long such as 4 hours or longer, and the holding temperature is set higher such as 1100° C. or higher, thereby the diffusion of components are facilitated hence the complete solid solution particle can be easily obtained.

Also, by increasing the temperature at a slow temperature increasing rate (for example, 10° C./hour or less, preferably 5° C./hour or less, and more preferably 2° C./hour or less) between 100° C. to 200° C. before reaching the holding temperature and up until reaching the holding temperature (a temperature range between the holding temperature and the temperature lower by 100° C. to 200° C. than the holding temperature), the complete solid solution particle tends to be easily obtained. For example, when the holding temperature is 1100° C., the temperature is increased at a relatively fast temperature increasing rate (for example, 200° C./hour) from the room temperature to 1000° C., then increasing the temperature at the temperature increasing rate of 10° C./hour or less, preferably 5° C./hour or less, and more preferably 2° C./hour or less between 1000° C. and 1100° C.; thereby each component diffuses uniformly, and the complete solid solution particle having uniform composition can be easily obtained. Although it is not to be limited theoretically in anyway, by slowing the temperature increasing rate before reaching the holding temperature, each component tends to be easily incorporated into the main component which is forming at the time, hence each component uniformly diffuses in the main component, thus it is thought that the complete solid solution particle having uniform composition can be obtained.

If needed, the calcined raw material obtained as such (the raw material after the reaction) is pulverized. Then, if needed, the calcined raw material is mixed with the additional main component raw material and the additional sub component raw material; thereby the dielectric raw material can be obtained. Note that, part of the components evaporates during the calcination, and the composition may change, thus the addition of the components to the calcined raw material may be determined so that it forms the desired composition after firing.

(Preparation of Paste)

Next, the dielectric raw material is made into paste, and then the dielectric paste is prepared. The dielectric layer paste may be an organic paste kneaded with the dielectric material and the organic vehicle, or it may be a water-based paste.

The organic vehicle is obtained by dissolving a binder in an organic solvent. The binder used in the organic vehicle is not particularly limited, and may be properly selected from variety of usual binders such as ethylcellulose, polyvinyl butyral, and the like. Also, the used organic solvent is not particularly limited, and may be appropriately selected from variety of organic solvents such as terpineol, butyl carbitol, acetone, toluene, and the like depending on a method used such as a printing method, a sheet method, and the like.

Also, when using a water-based dielectric layer paste, dielectric materials can be kneaded with a water-based vehicle obtained by dissolving an aqueous binder, a dispersant, and the like in water. The aqueous binder used for a water-based vehicle is not particularly limited, and for example, polyvinyl alcohol, cellulose, aqueous acrylic resin, and the like may be used.

(Preparation of Internal Electrode Layer Paste)

An internal electrode layer paste is obtained by kneading conductive materials made of the above mentioned various conductive metals and alloys; or various oxides, organometallic compound, resinate, and the like which become the above mentioned conductive materials after firing with the above mentioned organic vehicle. Also, in the internal electrode layer paste, the inhibitor is included. As the inhibitor, the dielectric material having higher Zr concentration than the dielectric material of the dielectric layer may be used.

As the dielectric material of the dielectric layer, when using the main component according to the preferable embodiment, the dielectric material which is preferably used as the inhibitor of the internal electrode layer is expressed by a compositional formula of $(Ba_{1-x-y}Sr_xCa_y)_m(Ti_{1-z'}Zr_{z'})O_3$ and z' is within the range of 0.05 to 0.5, and preferably 0.1 to 0.4. Here, the range of m, x, and y are the same as shown in the material of the main component of the dielectric layer, but it does not necessarily have to be the same.

Also, the ratio (z'/z) between Zr composition of the dielectric material used as the inhibitor of the internal electrode layer and Zr composition of the dielectric material of the dielectric layer is preferably larger than 0, more preferably 1.1 or larger, and particularly preferably 1.1 to 3.0. The dielectric material used as the inhibitor of the internal electrode layer can be obtained as same as the dielectric material of the above mentioned dielectric layer.

(Preparation of External Electrode Layer Paste)

An external electrode layer paste is obtained by kneading conductive materials made of the above mentioned various conductive metals and alloys; or various oxides, organometallic compound, resinate, and the like which become the above mentioned conductive materials after firing with the above mentioned organic vehicle. Also, an inhibitor may be included in the external electrode layer paste. An external electrode layer paste may be obtained as same as the above mentioned internal electrode layer paste.

The content of organic vehicle in each of the above mentioned pastes is not particularly limited, and may be a usual content, for example, the binder is 1 to 5 mass % or so and the solvent is 10 to 50 mass % or so. Also, in each paste, if needed the additives may be included which are selected from variety of dispersants, plasticizers, dielectrics, insulators, and the like. The total contents of these are preferably 10 mass % or less.

(Preparation of Green Chip)

When using the printing method, the dielectric layer paste and the internal electrode layer paste are printed on a substrate such as PET and the like to form layers, and after cutting into a predetermined shape, the green chip is obtained by removing from the substrate.

Also, when using the sheet method, a green sheet is formed by using the dielectric layer paste, and the internal electrode layer paste is printed thereon, then these are stacked and cut into a predetermined shape to form the green chip.

(Binder Removal, Firing, Annealing)

Before firing, the green chip is subjected to a binder removal treatment. The binder removal conditions are a temperature increasing rate of preferably 5 to 300° C./hour, a holding temperature of preferably 180 to 900° C., and a temperature holding time of preferably 0.5 to 24 hours. Also, the binder removal atmosphere is air or reduced atmosphere.

After carrying out binder removal, the green chip is fired. The atmosphere when firing the green chip can be suitably determined depending on the type of the conductive material in the internal electrode layer paste, and when using base metals such as Ni or Ni alloy and the like as the conductive material, the oxygen partial pressure of the firing atmosphere is preferably $10^{14}$ to $10^{10}$ MPa. When the oxygen partial pressure is below said range, the conductive material of the internal electrode layer may have abnormal sintering which may result in a breakage of the internal electrode layer. Also, when the oxygen partial pressure exceeds said range, the internal electrode layer tends to oxidize.

The holding temperature at firing is preferably 1000 to 1400° C., and more preferably 1100 to 1360° C. When the holding temperature is below said range, densification becomes insufficient; and when it exceeds said range, the electrode tends to break due to abnormal sintering of the internal electrode layer, the capacitance-temperature property tends to deteriorate due to the diffusion of the material constituting the internal electrode layer, or the dielectric ceramic composition tends to be reduced.

As for the firing condition other mentioned in above, the temperature increasing rate is preferably 50 to 2000° C./hour and more preferably 200 to 300° C./hour; the temperature holding time is preferably 0.5 to 8 hours and more preferably 1 to 3 hours; and the temperature decreasing rate is preferably 50 to 2000° C./hour, and more preferably 200 to 300° C./hour. Also, the firing atmosphere is preferably reduced atmosphere. As for the atmospheric gas, for example, wet mixed gas of $N_2$ and $H_2$ can be used.

After firing in a reduced atmosphere, it is preferable to anneal the capacitor element body. Annealing is a treatment for reoxidizing the dielectric layer, and thereby the lifetime can be significantly longer, thus the reliability improves.

The oxygen partial pressure in the annealing atmosphere is preferably $10^{-9}$ to $10^{-5}$ MPa. When the oxygen partial pressure is below the above range, it may be difficult to reoxidize the dielectric layer. When it exceeds the above range, the internal electrode layer tends to be further oxidized.

The holding temperature at annealing is preferably 1100° C. or less, particularly preferably 500 to 1100° C. When the holding temperature is below the above range, the dielectric layer may not be sufficiently oxidized, which tends to result in a low insulation resistance and a short high temperature accelerated lifetime. On the other hand, when the holding temperature exceeds the above range, not only the internal electrode layer is oxidized and the capacitance decreases, but also the internal electrode layer reacts with the dielectric element itself, which tends to easily cause deteriorated capacitance-temperature property, lowered insulation resistance, and lowered high temperature accelerated lifetime. Note that, the annealing may be constituted by temperature increasing step and temperature decreasing step. That is, the temperature holding time may be zero. In this case, the holding temperature is same as the maximum temperature.

Additional annealing conditions include: the temperature holding time of preferably 0 to 20 hours, more preferably 2 to 10 hours; and the temperature decreasing rate of preferably 50 to 500° C./hour, more preferably 100 to 300° C./hour. Also, for example, the atmospheric gas at annealing is preferably $N_2$ or $N_2+H_2O$ gas and the like.

Also, the binder removal treatment, firing, and annealing may be performed continuously or independently.

Along with firing, the internal electrode layer is sintered. As sintering proceeds, the dielectric particles blended as the inhibitor are pushed out from the internal electrode layer, and part of or all of these moves to the dielectric layer. Zr composition of the dielectric particle used as the inhibitor of the internal electrode layer is higher than Zr composition of the main component of the dielectric layer; hence a thin layer of dielectric particles having higher Zr concentration than the center part of the dielectric layer is formed near the internal electrode layer. Thereby, the dielectric layer satisfying Za/Zb defined by the present invention can be obtained.

The capacitor element body obtained as such is then carried out with an end surface polishing, for example, by a barrel polishing or a sand blasting, and the external electrode layer paste is pasted thereon, and then fired, thereby the external electrode 4 is formed. If needed, a coating layer may be formed on the surface of the external electrode 4 by plating or so.

The multilayer ceramic capacitor of the present embodiment produced as such is mounted on the printed-circuit board or so by soldering and the like to be used in variety of electronic devices and the like.

Hereinabove, an embodiment of the present invention is described, but the present invention is not to be limited to the above-mentioned embodiments and can be variously modified within the scope of the present invention.

For example, in the above-mentioned embodiment, a multilayer ceramic capacitor is exemplified as an electronic component according to the present invention. However, the electronic component according to the present invention is not limited to the multilayer ceramic capacitor and may be any having the dielectric layer having the above constitution.

As discussed in above, the electronic component according to the present invention has excellent IR property and a high temperature accelerated lifetime, thus it is particularly suited as the multilayer ceramic capacitor for the mid-high voltage having high rated voltage (for example 100 V or higher).

Example

Hereinafter, the present invention will be described based on the further detailed examples, but the present invention is not limited to the examples.
(Preparation of Dielectric Layer Paste)
(Material)

As the main component material, barium carbonate ($BaCO_3$), calcium carbonate ($CaCO_3$), strontium carbonate ($SrCO_3$), titanium oxide ($TiO_2$), and zirconium oxide ($ZrO_2$) were prepared. Further, oxides of the rare earth element as the first sub component material, magnesium oxide (MgO) as the second sub component, oxides of Mn and Cr as the material of the third sub component, and oxides of Si as the material of a sintering aid were prepared.

The main component material was weighed so that the main component composition after firing satisfied the composition shown in Table 2. Also, 14.0 mol of gadolinium oxide ($GdO_{3/2}$) as the first sub component material, 6.0 mol of magnesium oxide (MgO) as the second sub component material, 1.3 mol of oxide of Mn as the third sub component material, and 2.5 mol of oxide of Si as the material of the sintering aid were weighed with respect to 100 mol of the main component, and then these were mixed. The mixing was carried out for 20 hours by a ball mill using wet mix stirring. The compound obtained after the wet mix stirring was dehydrated and dried.
(Calcination)

After being dehydrated and dried, the temperature was raised from room temperature to 1000° C. at the temperature increasing rate of 200° C./hour, and the temperature was increased at the rate of 10° C./hour from 1000° C. to 1100° C. to calcine for 4 hours at 1100° C., and then pulverized if necessary. Thereby, powder of the calcined materials (dielectric materials) having the average particle size (circle equivalent diameter) of 0.2 μm was obtained.

(Preparation of Paste)

Next, the obtained dielectric material: 100 parts by mass, polyvinyl butyral resin: 10 parts by mass, dioctyl phthalate (DOP) as a plasticizer: 5 parts by mass, and alcohol as a solvent: 100 parts by mass were mixed by a ball mill to form paste; thereby a dielectric layer paste was obtained.
(Preparation of Internal Electrode Layer Paste)

Also, aside from the above, Ni particles: 37.2 parts by mass, terpineol: 52 parts by mass, ethyl cellulose: 3 parts by mass, benzotriazole: 0.4 parts by mass, and the dielectric material as the inhibitor: 7.4 parts by mass were kneaded by triple rolls to form paste; thereby an internal electrode layer paste was prepared. The dielectric material as the inhibitor was obtained by mixing each component so that Zr composition (z') of $Ba(Ti_{1-z'}Zr_{z'})O_3$ satisfied the composition shown in Table 2, then by carrying out calcination. The calcining condition is same as the preparation for the calcining material of the dielectric layer, and the calcining material having the average particle size (circle equivalent diameter) of 0.1 μm was obtained.
(Preparation of Green Chip)

Then, using the above obtained dielectric layer paste, on PET film, a green sheet was formed so that the thickness after drying was 15 μm (Sample numbers 1 to 17) or 1.5 μm (Sample numbers 18 to 23). Next, using the internal electrode layer paste, an electrode layer was printed in a predetermined pattern thereon, followed by removing the sheet from PET film, thereby the green sheet with the electrode layer was obtained. Then, a plurality of green sheets with the electrode layer were stacked and adhered by pressure to obtain a green multilayer body. The green multilayer body was cut into a predetermined size to obtain a green chip.
(Preparation of Multilayer Ceramic Capacitor)

Then, the obtained green chip was subjected to binder removal treatment, firing, and annealing under the following conditions, thereby a sintered body as an element main body was obtained.

The binder removal treatment was performed under the condition of the temperature increasing rate: 25° C./hour, the holding temperature: 260° C., the temperature holding time: 8 hours, and the atmosphere: air.

The firing condition was performed under the temperature rising rate: 200° C./hour, the holding temperature: 1200 to 1300° C., and the temperature holding time of 2 hours. The temperature decreasing rate was 200° C./hour. Note that, the atmospheric gas was wet mixed gas of $N_2+H_2$, and the oxygen partial pressure was $10^{-13}$ MPa.

Annealing was performed at the temperature increasing rate: 200° C./hour, the holding temperature: 1050° C., the temperature holding time: 2 hours, the temperature decreasing rate: 200° C./hour, and the atmospheric gas: wet gas of $N_2$ (the oxygen partial pressure: $10^{-7}$ MPa).

Note that, a wetter was used to wet the atmospheric gas during firing and annealing.

Next, after polishing end faces of the obtained sintered body with sandblast, In—Ga alloy was coated as an external electrode to obtain a sample of the multilayer ceramic capacitor shown in FIG. 1. In Sample numbers 1 to 17, the size of the obtained capacitor sample was 3.2 mm×1.6 mm×0.6 mm, the thickness of the dielectric layer was about 10 μm, the thickness of the internal electrode layer was about 1.0 μm, and the number of the dielectric layers sandwiched by the internal electrode layers was 5. In Sample numbers 18 to 23, the size of the obtained capacitor sample was 3.2 mm×1.6 mm×0.6 mm, the thickness of the dielectric layer was about 1.0 μm, the thickness of the internal electrode layer was about 0.8 μm, and the number of the dielectric layers sandwiched by the internal electrode layers was 5.

The obtained capacitor samples were subjected to the measurements of Zr concentration (Za) of the dielectric particle in the center part of the dielectric layer, Zr concentration (Zb) of the dielectric particle near the internal electrode layer, and the insulation resistance (IR) and the high temperature accelerated lifetime (MTTF) of the multilayer ceramic capacitor in accordance with the method shown in below.

Average Concentrations Zr (Za, Zb) of Dielectric Particles

Using Energy Ray Dispersive X-ray Spectrometer (EDS) attached to Scanning Transmission Electron Microscope (STEM), the point analysis of Ti and Zr was carried out.

In Sample numbers 1 to 17, the center part of the dielectric layer was defined as the area excluding upper 2 μm and bottom 2 μm in the thickness direction of the dielectric layer. In Sample numbers 18 to 23, the center part of the dielectric layer was defined as the area excluding upper 0.2 μm and bottom part 0.2 μm in the thickness direction of the dielectric layer. The dielectric particle contacting the internal electrode layer was selected as the dielectric particle near the internal electrode layer based on STEM image.

This point analysis was carried out by selecting arbitrary 10 or more points taking 100 nm apart with one another for each measuring particle, and it was carried out to 10 or more dielectric particles of the center part and near the internal electrode respectively. The average of Zr composition of each analysis point was taken when the concentration of Ti atom was deemed to be 100 atom %, thereby the average concentration of Zr (Za) of the dielectric particle in the center part of the dielectric layer and the average concentration of Zr (Zb) of the dielectric particle near the internal electrode layer were obtained.

The measuring point was selected from the area excluding the part 20 nm or less from the particle boundary of the dielectric particle.

Insulation Resistance (IR)

Using an insulation resistance meter (R8340A by Advantest) to a capacitor sample, for Sample numbers 1 to 17, DC voltage of 500 V was applied at 20° C. for 10 seconds and left for 50 second, then the insulation resistance IR after the voltage application was measured; and for Sample number 18 to 23, DC voltage of 10 V was applied at 20° C. for 10 seconds and left for 50 second, then the insulation resistance IR after the voltage application was measured. For Sample numbers 1 to 17, $3.0 \times 10^{12} \Omega$ or more was defined good (A), $3.5 \times 10^{12} \Omega$ or more was defined excellent (S), and less than $3.0 \times 10^{12} \Omega$ was defined poor (F). For Sample numbers 18 to 23, $3.0 \times 10^{11} \Omega$ or more was defined good (A), and less than $3.0 \times 10^{11} \Omega$ was defined poor (F).

High Temperature Accelerated Lifetime (MTTF)

For Sample numbers 1 to 17, the capacitor sample was applied with DC voltage under the electric field of 60 V/μm at 200° C., and for Sample numbers 18 to 23, the capacitor sample was applied with DC voltage under the electric field of 10 V/μm at 200° C., then by measuring an insulation deterioration time of the capacitor sample, the high temperature accelerated lifetime was evaluated. In the present example, the lifetime was defined as the time which took for the insulation resistance to drop by one digit from the start of the voltage application. Also, in the present example, the above mentioned evaluation was carried out to 10 capacitor samples, then Mean Time To Failure was calculated by carrying out Weibull analysis, then this Mean Time To Failure was defined as the high temperature accelerated lifetime of the sample. For Sample numbers 1 to 17, 100 hours or longer was defined good (A), 150 hours or longer was defined excellent (S), and less than 100 hours was defined failure (F). For Sample numbers 18 to 23, 10 hours or longer was defined good (A), and less than 10 hours of defined poor (F).

Results of the above are shown in following Tables. In following Tables, the sample shown with * indicates that it was out of the range of claim 1.

TABLE 1

| | Sample No | Zr concentration of dielectric particle in center part of dielectric layer Za | Zr concentration of dielectric particle near internal electrode layer Zb | Za/Zb | Thickness of dielectric layer [μm] | IR[Ω] 500 V, 1 min | Evaluation | High temperature accelerated lifetime (MTTF) [h] 200 °C., 60 V/um | Evaluation |
|---|---|---|---|---|---|---|---|---|---|
| ※ | 1 | 12.5 | 13.1 | 0.95 | 9.9 | 6.2E+09 | F | unable to measure | F |
| | 2 | 13.4 | 14.4 | 0.93 | 10.1 | 3.2E+12 | A | 124 | A |
| | 3 | 14.4 | 15.5 | 0.93 | 10.0 | 3.2E+12 | A | 101.1 | A |
| ※ | 4 | 12.5 | 13.6 | 0.92 | 10.0 | 3.3E+12 | A | 63.0 | F |
| ※ | 5 | 1.7 | 1.8 | 0.94 | 10.3 | 7.2E+11 | F | 160.0 | S |
| | 6 | 2.5 | 2.7 | 0.93 | 9.9 | 3.2E+12 | A | 148.0 | A |
| | 7 | 33.4 | 34.2 | 0.98 | 10.1 | 3.4E+12 | A | 124.2 | A |
| ※ | 8 | 34.0 | 36.9 | 0.92 | 10.2 | 3.6E+12 | S | 52.9 | F |
| ※ | 9 | 14.2 | 13.0 | 1.09 | 10.3 | 9.8E+11 | F | 12.1 | F |
| ※ | 10 | 14.9 | 14.7 | 1.01 | 10.0 | 2.3E+12 | F | 78.5 | F |
| | 11 | 16.3 | 16.4 | 0.99 | 9.8 | 3.0E+12 | A | 102.2 | A |
| | 12 | 15.5 | 16.6 | 0.93 | 9.9 | 3.1E+12 | A | 128.2 | A |
| | 13 | 15.8 | 17.5 | 0.90 | 10.0 | 3.3E+12 | A | 130.1 | A |
| | 14 | 11.4 | 13.0 | 0.88 | 10.0 | 3.5E+12 | S | 133.3 | A |
| | 15 | 17.0 | 17.9 | 0.95 | 10.2 | 3.1E+12 | A | 110.1 | A |
| | 16 | 22.1 | 23.3 | 0.95 | 10.1 | 3.0E+12 | A | 105.2 | A |
| | 17 | 20.5 | 21.5 | 0.95 | 10.0 | 3.1E+12 | A | 103.0 | A |
| ※ | 18 | 13.5 | 10.0 | 1.35 | 1.2 | 5.6E+08 | F | 0 | F |
| ※ | 19 | 18.0 | 14.7 | 1.22 | 1.0 | 2.0E+10 | F | 3.1 | F |

TABLE 1-continued

| Sample No | Zr concentration of dielectric particle in center part of dielectric layer Za | Zr concentration of dielectric particle near internal electrode layer Zb | Za/Zb | Thickness of dielectric layer [μm] | IR[Ω] 500 V, 1 min Evaluation | | High temperature accelerated lifetime (MTTF) [h] 200 °C., 60 V/um Evaluation | |
|---|---|---|---|---|---|---|---|---|
| ※ 20 | 17.7 | 16.4 | 1.08 | 1.1 | 7.0E+10 | F | 8.2 | F |
| 21 | 15.5 | 15.6 | 0.99 | 1.0 | 3.3E+11 | A | 15.0 | A |
| 22 | 16.0 | 17.5 | 0.91 | 1.0 | 3.5E+11 | A | 20.0 | A |
| 23 | 11.1 | 13.5 | 0.82 | 1.1 | 3.8E+11 | A | 22.0 | A |

TABLE 2

| | Sample No | Main component of dielectric layer $(Ba_{1-x-y}Sr_xCa_y)_m(Ti_{1-z}Zr_z)O_3$ | | | | Inhibitor composition for internal electrode layer $Ba(Ti_{1-z'}·Zr_{z'}·)O_3$ | Ratio |
|---|---|---|---|---|---|---|---|
| | | m | x | y | z | z' | z'/z |
| ※ | 1 | 0.895 | 0 | 0.01 | 0.13 | 0.20 | 1.5 |
| | 2 | 0.900 | 0.02 | 0 | 0.14 | 0.20 | 1.4 |
| | 3 | 1.100 | 0 | 0 | 0.15 | 0.20 | 1.3 |
| ※ | 4 | 1.105 | 0 | 0.03 | 0.13 | 0.20 | 1.5 |
| ※ | 5 | 0.990 | 0 | 0.01 | 0.02 | 0.20 | 10.0 |
| | 6 | 1.000 | 0 | 0 | 0.03 | 0.20 | 6.7 |
| | 7 | 1.050 | 0.03 | 0.01 | 0.30 | 0.32 | 1.1 |
| ※ | 8 | 0.980 | 0 | 0.01 | 0.31 | 0.20 | 0.6 |
| ※ | 9 | 1.000 | 0 | 0 | 0.14 | 0.00 | 0.0 |
| ※ | 10 | 1.000 | 0 | 0 | 0.14 | 0.10 | 0.7 |
| | 11 | 1.000 | 0 | 0.01 | 0.17 | 0.18 | 1.1 |
| | 12 | 0.985 | 0.01 | 0.03 | 0.16 | 0.20 | 1.3 |
| | 13 | 0.980 | 0 | 0 | 0.16 | 0.24 | 1.5 |
| | 14 | 1.050 | 0 | 0.01 | 0.12 | 0.30 | 2.5 |
| | 15 | 0.970 | 0.3 | 0.3 | 0.16 | 0.20 | 1.3 |
| | 16 | 0.990 | 0.5 | 0.1 | 0.19 | 0.20 | 1.1 |
| | 17 | 0.980 | 0.1 | 0.1 | 0.18 | 0.20 | 1.1 |
| ※ | 18 | 1.000 | 0 | 0 | 0.14 | 0.00 | 0.0 |
| ※ | 19 | 1.000 | 0 | 0 | 0.18 | 0.05 | 0.3 |
| ※ | 20 | 1.000 | 0 | 0 | 0.17 | 0.10 | 0.6 |
| | 21 | 1.001 | 0 | 0.02 | 0.17 | 0.20 | 1.2 |
| | 22 | 1.000 | 0 | 0 | 0.15 | 0.20 | 1.3 |
| | 23 | 1.002 | 0.01 | 0.01 | 0.12 | 0.20 | 1.7 |

Figure 4:
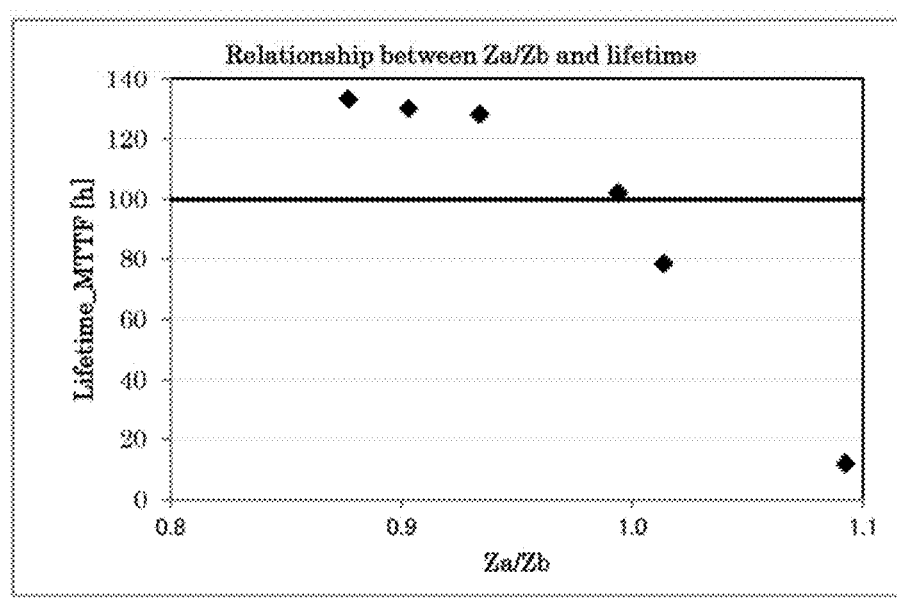
FIG. 4 shows a relationship between Za/Zb and a high temperature accelerated lifetime (MTTF) of Sample numbers 9 to 14.

FIG. 4 shows the relationship between Za/Zb and the high temperature accelerated lifetime (MTTF) of Sample numbers 9 to 14. According to FIG. 4, it is apparent that when Za/Zb was below 1, the high temperature accelerated lifetime significantly improved.

Figure 5:
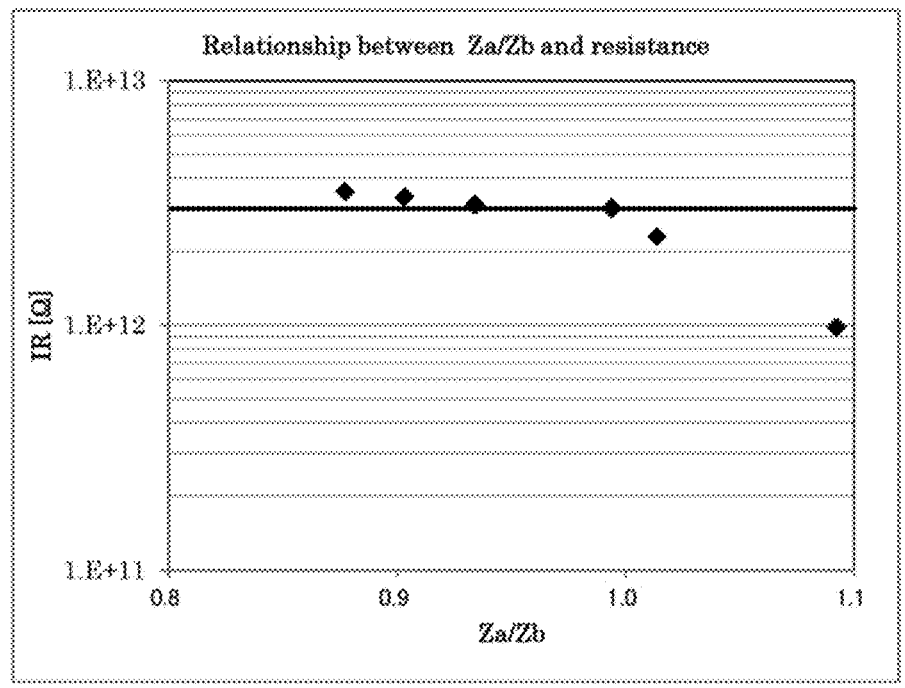
FIG. 5 shows a relationship between Za/Zb and an insulation resistance (IR) of Sample numbers 9 to 14.

FIG. 5 shows the relationship between Za/Zb and the insulation resistance (IR) of Sample numbers 9 to 14. According to FIG. 5, it is apparent that when Za/Zb was below 1, the insulation resistance (IR) significantly improved.

1 . . . Multilayer ceramic capacitor
2 . . . Dielectric layer
3 . . . Internal electrode layer
4 . . . External electrode
10 . . . Capacitor element main body

What is claimed is:

1. A multilayer ceramic capacitor including a capacitor element body comprising a dielectric layer and an internal electrode layer stacked in an alternating manner,
wherein when Za represents an average Zr concentration of dielectric particles in a center part of the dielectric layer and Zb represents an average Zr concentration of dielectric particles near the internal electrode layer,
0<(Za/Zb)<1 is satisfied, and
a dielectric ceramic composition constituting the dielectric layer includes a main component made of a perovskite type compound expressed by a compositional formula of $Ba_{1-x-y}Sr_xCa_y)_m(Ti_{1-z}Zr_z)O_3$,
where m, x, y, and z of the above compositional formula all represent mole ratios, and each satisfies 0.9≤m<1.0, 0≤x≤0.1, 0≤y≤0.01, 0≤(x+y)≤0.4, and 0.1≤z≤0.18.

2. The multilayer ceramic capacitor according to claim 1, wherein Za/Zb satisfies 0<(Za/Zb)<0.9.

* * * * *